United States Patent
Anderson et al.

(10) Patent No.: US 7,717,240 B2
(45) Date of Patent: May 18, 2010

(54) ELECTRIC BRAKE FOR AIRCRAFT

(75) Inventors: Steve Anderson, Upper Saddle River, NJ (US); Robert L. Brundrett, Troy, OH (US); Lawrence F. Corio, Troy, OH (US); Timothy M. Himes, Troy, OH (US); Paul J. Howard, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 883 days.

(21) Appl. No.: 10/554,941

(22) PCT Filed: Apr. 30, 2004

(86) PCT No.: PCT/US2004/013213

§ 371 (c)(1),
(2), (4) Date: Aug. 14, 2006

(87) PCT Pub. No.: WO2005/001303

PCT Pub. Date: Jan. 6, 2005

(65) Prior Publication Data

US 2007/0187192 A1 Aug. 16, 2007

(51) Int. Cl.
*F16D 65/36* (2006.01)
(52) U.S. Cl. ............... 188/156; 188/72.8; 188/162; 310/77
(58) Field of Classification Search ............ 188/156, 188/71.3, 71.9, 72.1, 72.7, 72.8, 73.1, 158, 188/162, 216, 265; 310/77, 80, 83; 439/34, 439/639, 692

See application file for complete search history.

(56) References Cited

U.S. PATENT DOCUMENTS

| 4,567,967 | A | * | 2/1986 | Crossman | 188/72.3 |
|---|---|---|---|---|---|
| 4,596,316 | A | * | 6/1986 | Crossman | 188/72.1 |
| 4,865,162 | A | * | 9/1989 | Morris et al. | 188/72.8 |
| 5,185,542 | A | * | 2/1993 | Lazorchak | 310/36 |
| 5,452,948 | A | * | 9/1995 | Cooper et al. | 303/119.3 |
| 5,620,077 | A | | 4/1997 | Richard | |
| 6,095,293 | A | * | 8/2000 | Brundrett et al. | 188/72.1 |
| 6,173,820 | B1 | | 1/2001 | Blattert et al. | |
| 6,244,671 | B1 | * | 6/2001 | Tamai | 303/119.3 |
| 6,471,017 | B1 | * | 10/2002 | Booz et al. | 188/72.7 |
| 6,581,730 | B1 | * | 6/2003 | Haydon et al. | 188/71.5 |
| 2006/0042889 | A1 | * | 3/2006 | Linden et al. | 188/71.5 |
| 2006/0102436 | A1 | * | 5/2006 | Haydon et al. | 188/72.7 |

FOREIGN PATENT DOCUMENTS

| EP | 1 084 949 | 3/2001 |
|---|---|---|
| FR | 2 813 580 | 3/2002 |

* cited by examiner

*Primary Examiner*—Pam Rodriguez
(74) *Attorney, Agent, or Firm*—Snell & Wilmer L.L.P.

(57) ABSTRACT

An electric brake comprises an actuator module including a module housing, a reciprocating ram, and an electric motor operatively connected to the reciprocating ram for selectively extending and retracting the reciprocating ram with respect to the module housing. The ram has an inner portion of non-circular cross-section and an outer portion of circular cross-sectional, and the housing has a guideway for the ram, which guideway has an inner portion of non-circular cross-section for interacting with the inner portion of the ram to prevent rotation of the inner portion of the ram, and an outer portion of circular cross-sectional. The actuator module can be equipped with a bi-stable holding brake having a first state permitting at least retraction of the ram and a second state preventing at least retraction of the ram.

18 Claims, 6 Drawing Sheets

ELECTRIC BRAKE FOR AIRCRAFT

This application is a national phase of International Application No. PCT/US2004/013213 filed Apr. 30, 2004 and published in the English language.

FIELD OF THE INVENTION

The invention herein described relates generally to an electric brake particularly useful in aircraft, and more particularly to an electric brake actuator assembly, components thereof, and associated methods of assembly and operation.

BACKGROUND OF THE INVENTION

Known in the prior art are aircraft wheel and brake assemblies including a non-rotatable wheel support, a wheel mounted to the wheel support for rotation, and a brake disk stack having front and rear axial ends and alternating rotor and stator disks mounted with respect to the wheel support and wheel for relative axial movement. Each rotor disk is coupled to the wheel for rotation therewith and each stator disk is coupled to the wheel support against rotation. A back plate is located at the rear end of the disk stack and a brake head is located at the front end. The brake head houses a plurality of actuator rams that extend to compress the brake disk stack against the back plate. Torque is taken out by the stator disks through a static torque tube or the like.

Electrically actuated aircraft brakes of various configurations are known, as exemplified by U.S. Pat. Nos. 4,381,049, 4,432,440, 4,542,809 and 4,567,967. The brake assemblies shown in these patents include electric motors which respond to an electrical control signal to effect rotation of a ring gear member which interacts through a plurality of balls to drive a linearly movable ram member into contacting engagement with a brake disk stack to effect compression thereof and braking of a wheel.

In U.S. Pat. No. 4,596,316, another configuration of an electrically actuated brake uses a roller screw drive wherein a ring gear member interacts through a plurality of roller screws to drive a ram member into engagement with the brake pressure plate to effect compression of the brake disk stack for braking action. A plurality of electric motors and their associated pinions drive a ring gear into rotation and the plurality of roller screws effect linear axial movement of the ram member.

In U.S. Pat. No. 4,865,162, a further electrically actuated aircraft brake employs a roller screw drive mechanism driven by an electric torque motor through a gear drive associated with either the screw or the nut of the roller screw drive mechanism. Rotation of the gear drive by the torque motor moves the other one of the screw or nut into axial engagement with a brake disk stack to compress the stack for braking. A plurality of the roller screw drive mechanisms and respective gear drives and torque motors are mounted in a balanced arrangement about the axis of the wheel to apply and release a brake pressure force on the brake disk stack in response to an electrical control signal to the torque motors.

The repair or maintenance of these previously known brakes including torque motor driven rams heretofore has required significant disassembly of the brake. The complex integrated nature of prior art designs normally requires substantial teardown of the assembly for maintenance, repair and/or overhaul of the assembly even if minor repair or only replacement of a single faulty component is required. Associated with extensive teardown is a lengthy reassembly and retest procedure to verify flight worthiness. Also, a highly integrated design and assembly with complex machining and assembly procedures is costly to process and manufacture. Distribution and parts stocking of individual components of such an assembly is similarly complex and inefficient as can be appreciated by those knowledgeable in this area. Consequently, an aircraft, for example a commercial passenger aircraft, would most likely have to be taken out of scheduled service until a faulty actuator could be serviced. This results in lost revenue for the airline, scheduling adjustments, considerable inconvenience for customers, etc.

U.S. Pat. No. 6,095,293 discloses an electric brake and method characterized by the use actuator modules each of which can be easily and quickly replaced as a unit. This enables quick and easy replacement of the actuator modules without requiring disassembly of the overall brake and wheel assembly. Also, it is conceivable that a malfunctioning actuator module could be replaced on an aircraft and tested with a minimum of equipment preferably quickly enough to allow the aircraft to remain in scheduled service and/or with a minimum of downtime. In addition, periodic maintenance of the brake can be done quicker and more efficiently by replacing the actuator modules with reconditioned and/or new actuator modules.

The electric brake described in U.S. Pat. No. 6,095,293 comprises a brake disk stack, a brake head, and at least one actuator module mounted to the brake head. The actuator module includes a module housing, a reciprocating ram and a motive device, i.e, an electric motor, operatively connected to the reciprocating ram for selectively moving the reciprocating ram into and out of forceful engagement with the brake disk stack for applying and releasing braking force. The actuator module is removable as a unit from one side of the brake head and most preferably from the side of the brake head opposite the brake disk stack. The ram includes a ram nut, and the electric motor is drivingly connected to a lead screw, e.g. a ball screw, in threaded engagement with the ram nut whereupon rotation of the lead screw effects linear movement of the nut toward and away from the brake disk stack. The module housing includes a guideway for guiding the ram nut, and the guideway and ram nut respectively have polygonal cross-sections defined by plural outer side surfaces which rotationally interfere with one another to restrain rotation of the ram nut relative to the housing.

SUMMARY OF THE INVENTION

The present invention provides a number of improvements over known electric brakes. The several aspects of the invention are below summarized.

According to one aspect of the invention, an electric brake actuator module comprises a module housing; a reciprocating ram; and an electric motor operatively connected to the reciprocating ram for selectively extending and retracting the reciprocating ram with respect to the module housing. The ram has an inner portion of non-circular cross-section and an outer portion of circular cross-section, and the housing has a guideway for the ram, which guideway has an inner portion of non-circular cross-section for interacting with the inner portion of the ram to prevent rotation of the inner portion of the ram, and an outer portion of circular cross-sectional.

In a preferred embodiment, an annular seal is provided between the outer portion of the ram and the outer portion of the guideway; the electric motor is operatively connected to the ram by a screw and a nut linearly driven by the screw, with the inner portion of the ram including the nut; the screw and nut are a ball screw and a ball nut; the guideway is formed by a bore in the housing; and/or the drive motor is operatively connected to the screw by reducing gears carried on shafts mounted in the housing for rotation about axes parallel to the rotational axes of the drive motor and screw.

According to another aspect of the invention, an electric brake actuator module, comprises a module housing; a reciprocating ram; an electric motor operatively connected to the reciprocating ram for selectively extending and retracting the reciprocating ram with respect to the module housing; and a bi-stable holding brake having a first state permitting at least retraction of the ram and a second state preventing at least retraction of the ram.

In a preferred embodiment, the motor is operatively connected to the reciprocating ram by at least one gear on a shaft, and the bi-stable holding brake is coupled to the shaft for permitting rotation of the shaft when in its first state and preventing rotation of the shaft when in its off state.

According to a further aspect of the invention, an electric brake actuator module, comprises a module housing; a reciprocating ram having a movement direction; an electric motor operatively connected to the reciprocating ram for selectively extending and retracting the reciprocating ram with respect to the module housing; and an electrical connector on the housing, the electrical connector having an insertion direction for connecting to a mating connector, and the insertion direction is parallel to the movement direction of the ram.

According to a still further aspect of the invention, an electric brake actuator module, comprises a module housing; a reciprocating ram having a movement direction; an electric motor operatively connected to the reciprocating ram for selectively extending and retracting the reciprocating ram with respect to the module housing; and an electrical connector on the housing, the electrical connector having an insertion direction for connecting to a mating connector, and the insertion direction is perpendicular (or alternatively parallel) to the movement direction of the ram.

According to yet another aspect of the invention, a cable conduit for an electric brake, comprises a generally arcuate-shaped channel; a plurality of module connectors disposed along the length of the channel for connecting to respective actuator modules of an electric brake; a common connector disposed along the length of the channel for connecting to an external cable; and electrical wiring in the channel for connecting the common connector to each of the module connectors.

In a preferred embodiment, each module connector has an insertion direction for connecting to a mating connector that is parallel to the insertion direction of each other module connector.

According to still another aspect of the invention, a brake comprises a brake head, and at least one actuator module mounted to the brake head, the actuator module including a reciprocating ram, a motive device operatively connected to the reciprocating ram for selectively moving the reciprocating ram into and out of forceful engagement with a brake disk stack for applying and releasing braking force, and a module housing in which the ram and motive device are carried for removal from the brake head as a unit. The brake head has at least one radially outwardly opening slot at a radially outer side thereof for receiving said one actuator module.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DETAILED DESCRIPTION OF THE INVENTION

Because the invention was conceived and developed for use in an aircraft braking system, it will be herein described chiefly in this context. However, the principles of the invention in their broader aspects can be adapted to other types of braking systems, such as in train brake systems.

Figure 1:
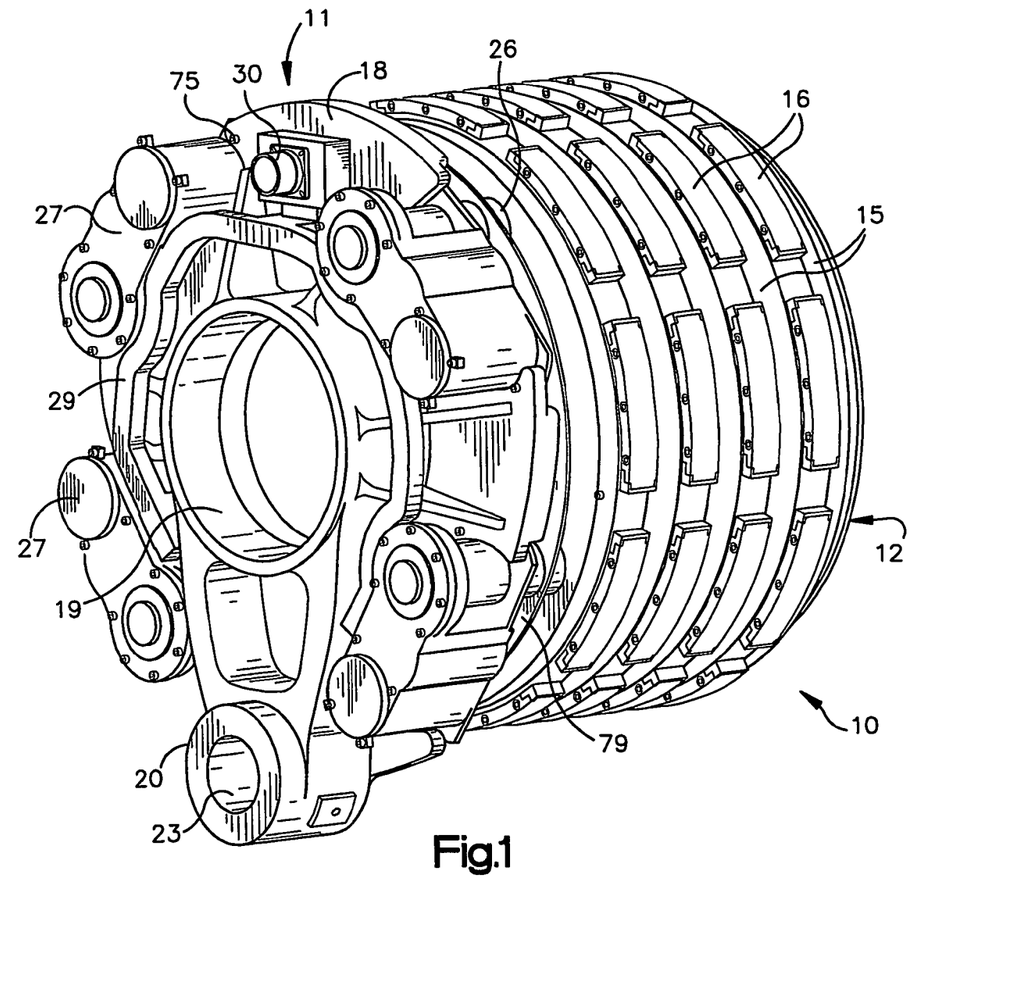
FIG. 1 is perspective rendering of an electric brake according to the invention.
Figure 2:
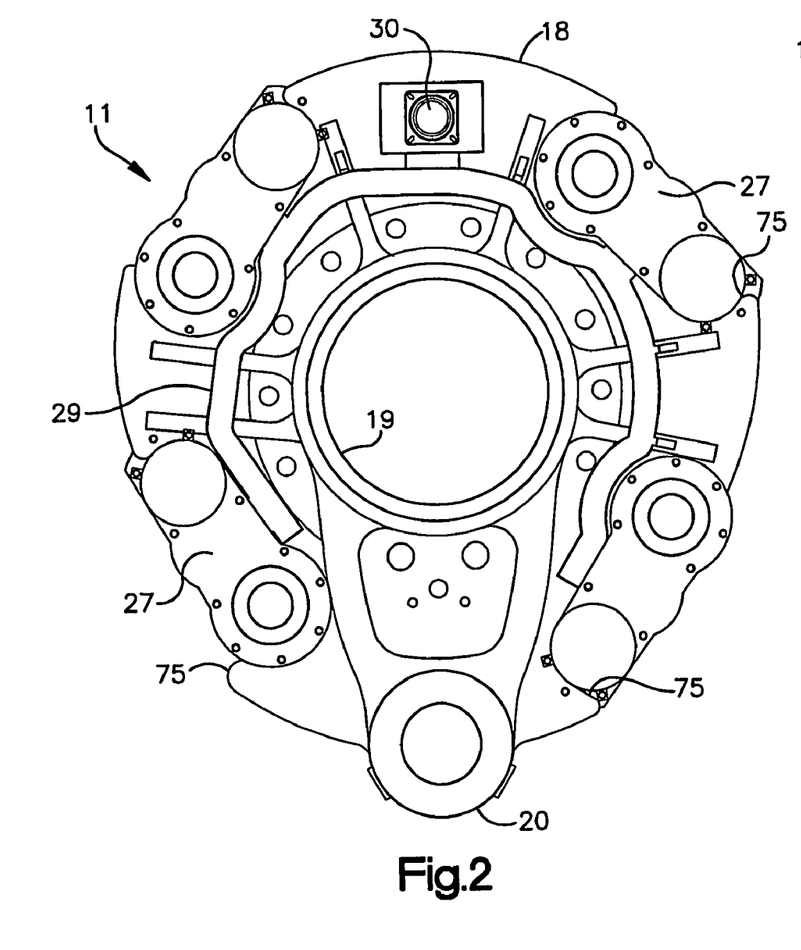
FIG. 2 is an end elevational view of the electric brake.
Figure 3:
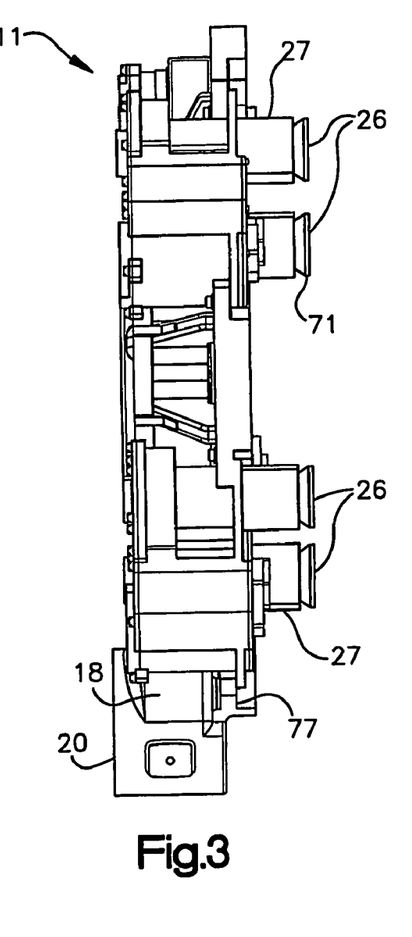
FIG. 3 is a radial side elevational view of the electric brake.
Figure 4:
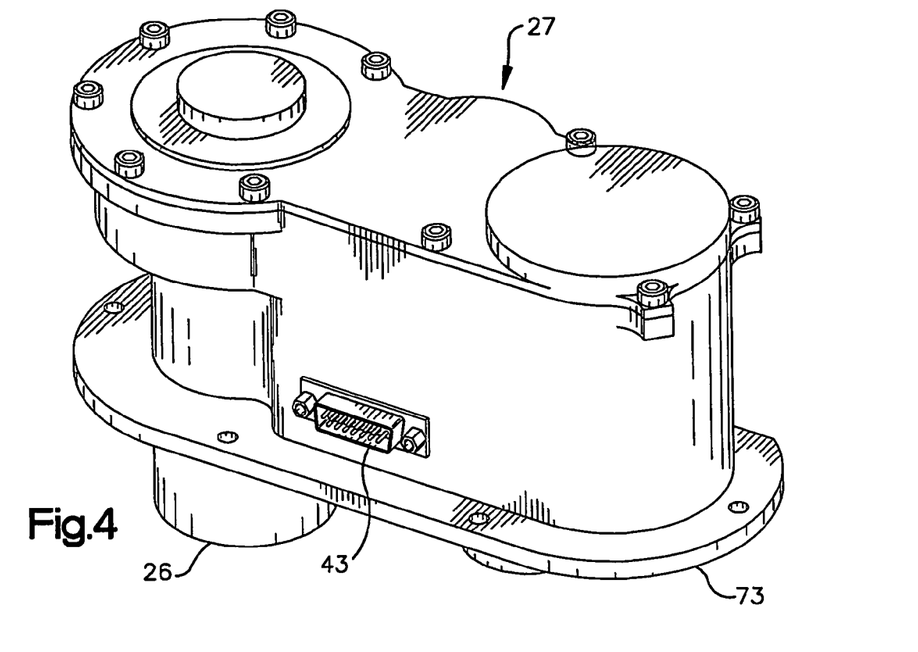
FIG. 4 is a perspective view of an actuator module used in the electric brake.
Figure 5:
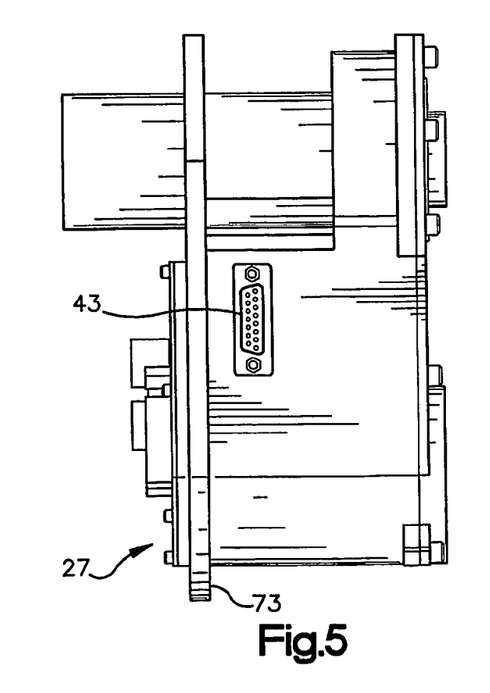
FIG. 5 is a side elevational view of the actuator module.
Figure 6:
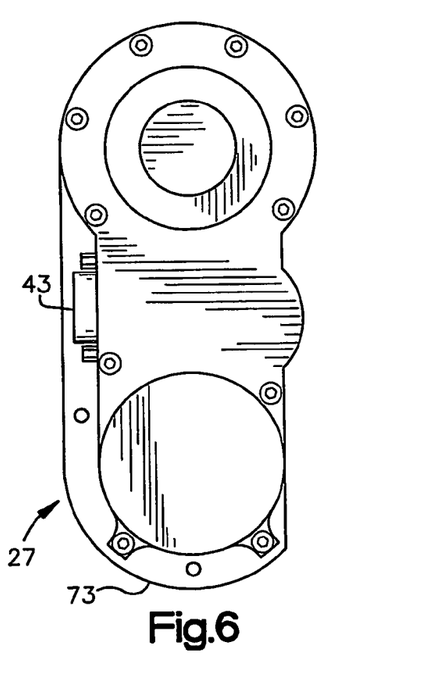
FIG. 6 is plan view of the actuator module.
Figure 7:
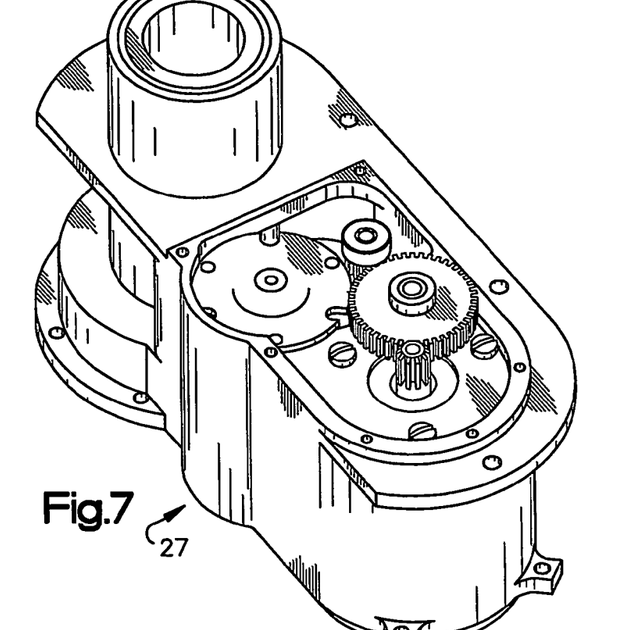
FIG. 7 is a perspective view of the actuator module with a bottom cover removed.
Figure 8:
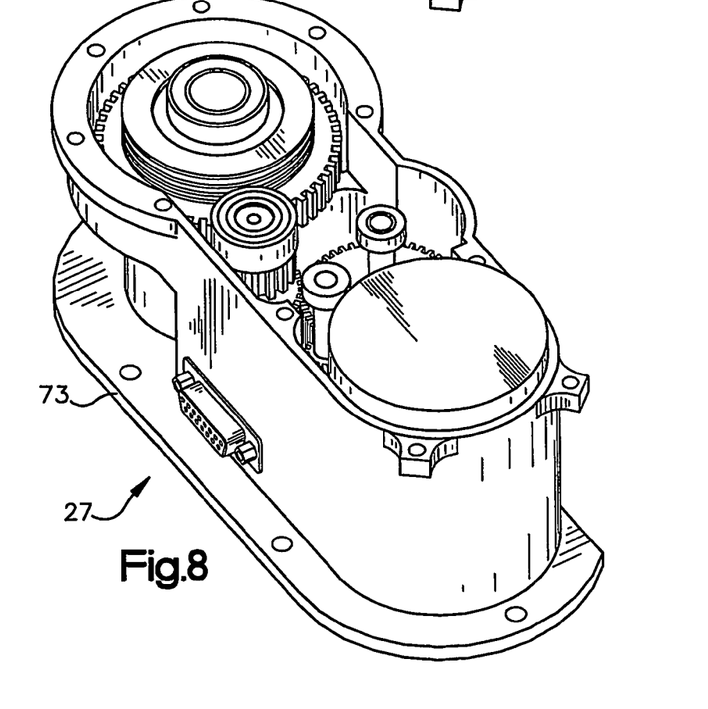
FIG. 8 is another perspective view of the actuator module with a top cover removed.

Referring now in detail to the drawings and initially to FIGS. 1-3, an electric brake according to the present invention is generally indicated at 10. The brake 10 generally comprises a brake actuator assembly 11 and a heat sink in the form of a brake disk stack 12. The brake disk stack 12 can be of a conventional design including stationary brake elements and rotary brake elements that are interleaved and surround a torque tube or equivalent (not shown). The stationary and rotary brake elements usually are in the form of stator disks 15 and rotor disks 16. The stator disks 15 typically are splined to the torque tube and the rotor disks 16 are splined to a wheel (not shown) interiorly of the wheel's rim. As is conventional, the splined connection may be effected by a plurality of spline or drive keys that are spaced around the circumference of the rim/torque tube to permit axial movement of the rotor/stator disks while being held to the wheel/torque tube against relative rotation.

The wheel (not shown) typically is supported for rotation on an axle (not shown) by axially spaced apart bearings (not shown). The axle thus forms a wheel mount and typically is attached to an aircraft landing gear strut or truck (not shown).

The brake actuator assembly 11 includes a brake head 18 (also commonly referred to as a brake housing) having a central opening 19 for mounting of the brake head on the landing gear axle or other wheel support. For some applications the brake head can be formed integrally with or fixedly secured (as by splines, bolts, etc.) to the axle or other wheel support for direct transfer of braking torque to the axle or other wheel support. In the illustrated embodiment, the brake head is supported on the axle for limited rotational movement, and the brake head is provided with a torque take-out arm 20. The torque take-out arm 20 extends radially and functions as a torque transfer interface between the brake actuator assembly and the landing gear axle/strut/truck structure. More particularly, the torque take-out arm 20 has an eye 23 the provides for connection to a brake rod that in turn is connected to the landing gear axle/strut/truck structure, as in a conventional manner, to provide for transfer of torque from the torque take-out arm to the landing gear axle/strut truck structure when braking force is being applied to the disk brake stack 12 by the brake actuator assembly 11.

The disk stack 12 typically is located between a back pressure member (not shown) and the brake head 18. The back pressure member can be formed by a radial flange at the end of the torque tube opposite the brake head, which radial flange engages the last brake disk at the outboard end of the disk stack typically through the use of a plurality of circumferentially spaced apart pucks.

Pressure is applied to the other or inboard end of the disk stack 12 by the ram 26 of one or more actuator modules 27 that are mounted to the brake head 18. The actuator modules 27 preferably are mounted in a circular arrangement around the center axis of the brake head 18, preferably with the actuator rams 26 generally circumferentially equally spaced apart or with the rams arranged in diametrically opposed pairs. In the illustrated preferred embodiment, the actuator modules 27 are each electrically connected to an electrical cable conduit 29 that has a single interface connector 30 to which a mating connector of a control cable (not shown) can be detachably connected for connecting the brake 10 to a brake controller (not shown) located elsewhere.

Figure 9:
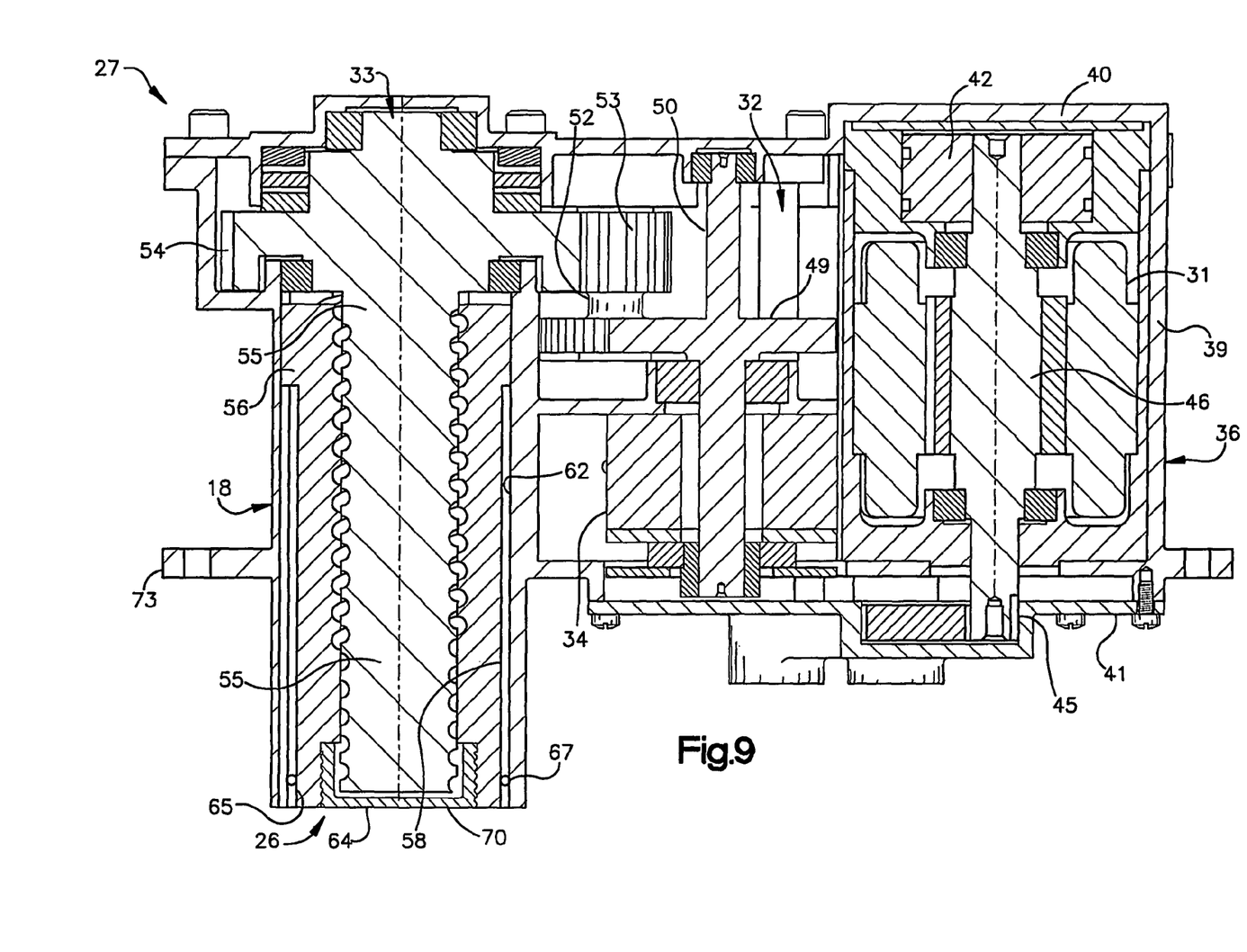
FIG. 9 is a cross-sectional view of the actuator module.
Figure 10:
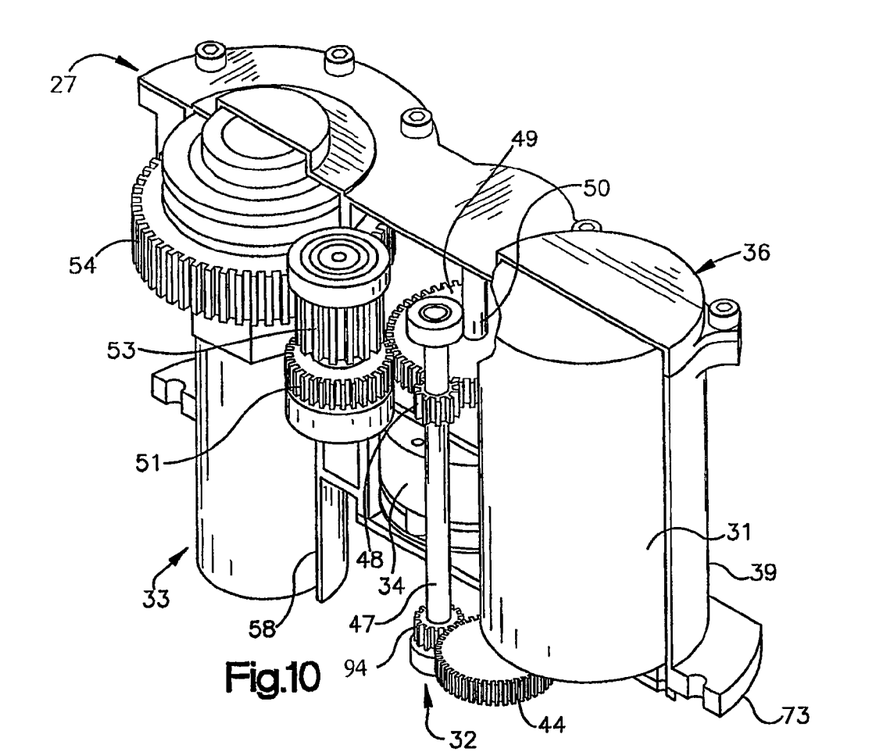
FIG. 10 is a perspective view of the actuator module with parts of the housing broken away to reveal internal components.

Preferably, the actuator modules 27 are identical and interchangeable, and a representative one of the actuator modules is shown in FIGS. 4-10. As best seen in FIGS. 9 and 10, each actuator module 27 preferably includes an electric motor 31, a gear train 32, a ball screw and nut assembly 33, and a bi-stable holding brake 34. The motor 31, gearing 32, ball screw and nut assembly 33, and holding brake 34 are all carried in a module housing 36. In the illustrated embodiment, the module housing 36 includes a case 39 having a top opening closed by a top cover 40 and a bottom opening closed by a bottom cover 41. The openings provide for assembly of the various internal components of the actuator module in the module housing.

The motor 31 can be of any suitable type, such as a brushless DC servo motor that may have integrated or otherwise associated therewith a resolver 42 for motor rotor commutation, angular velocity sensing and/or position sensing. The resolver can provide motor position feedback and velocity information. In particular, the resolver can provide an electrical signal that is proportional to motor shaft position under normal operating conditions. Power and control and/or output signals to or from the motor, resolver and holding brake 34 can be provided via an electrical connector 43 (FIGS. 4-6), which in the illustrated embodiment is located on an inner side of the actuator module housing for connecting to a mating connector provided in the cable conduit 29.

The gear train 32 provides for multiple stages of reduction. A first stage gear 44 meshes with a gear 45 integral with the drive shaft 46 of the motor 31. The gear 44 meshes with a gear 94 on a shaft 47 that has a further gear 48 that meshes with a gear 49 provided on a shaft 50. The gear 49 also meshes with a gear 51 provided on a shaft 52. The shaft 52 has a further gear 53 that meshes with a screw drive gear 54 that preferably is formed integrally with the ball screw 55 of the ball screw and nut assembly 33. The axes of the several shafts preferably are parallel with the axis of the ball screw and also the shaft 46 of the motor. Also, the shafts and ball screw are suitably journalled in the housing by suitable bearings for rotation about their respective axes, as is illustrated in FIGS. 9 and 10.

In addition to the ball screw 55, the ball screw and nut assembly 33 includes ball nut 56 that moves linearly in response to rotation of the ball screw. It perhaps should be mentioned here that while a ball screw and nut are shown, other types of screw and nut assembly can be alternatively used, as can other types of rotary to linear motion conversion devices. The ball nut 56 is attached to or, as illustrated, formed as part of the actuator ram 26. The ball nut and thus also the ram are free to translate along the axis of the ball screw 55 upon rotation of the ball screw, while, rotation of the ball nut is constrained. In the illustrated embodiment, rotation is constrained by interaction of the ball nut with a guideway 58 for the ram in the module housing 36.

In the illustrated embodiment, the guideway 58 is formed by a bore in the casing 39 of the housing 18. The bore has an inner longitudinal portion 62 of non-circular cross-section for interacting with a non-circular cross-section of the ram nut 56 to prevent rotation of the ram nut relative to the housing. By way of a preferred example, the cross-sections of the ball nut and inner portion of the guideway 58 can have corresponding hexagonal or other polygonal shapes.

As is preferred, the ram nut 56 extends only partway along the linear extent of the ram 26, whereas the outer or forward portion 64 of the ram is circular in cross-section. Similarly, the outer or forward portion 65 of the guideway 58 is circular in cross-section for guided movement of the cylindrical outer portion of the ram. The corresponding circular cross-sections are easier to seal than non-circular cross-sections. As shown, the guideway has at its outer end an annular groove for receiving a wiper or other suitable seal 67 for preventing foreign matter from entering the module housing and/or for retaining lubricant with the module housing. As will be appreciated, the length of the non-circular inner portion of the guideway will be greater than the length of the ball nut to allow for linear movement of the ball nut. The length of the non-circular inner portion of the guideway will also determine the stroke of the ram. In the illustrated embodiment, the length of the circular outer portion of the guideway is about equal the length of the ram nut. The particular dimensions can be varied as desired for a given application.

Preferably, a lubricant, particularly a suitable grease, is used to lubricate the relatively sliding surfaces of the ball nut/ram and the guideway 58. It has been found that the grease and close clearance between the ball nut 56 and guideway 58 prevent entry of any appreciable amount of dirt or other foreign material at the sliding surfaces interface so as to prevent any significant degradation of performance. However, as above mentioned, a suitable seal 67, such as a wiper seal or a rolling diaphragm seal, is employed to seal against passage of dirt or other undesirable materials between the sliding surfaces. An exemplary grease for the ball screw and ram nut assembly is MIL-G-81322 and an exemplary grease for the gear train is MIL-G-81827.

As shown, the ram 26 may be tubular and have its outer end closed by a cap 70 screwed into the end of the bore in the ram or otherwise secured to the ram. The cap can also be used as a convenient means to attach an insulating pad 71 to the end of the ram as depicted in FIG. 3, which pad provides the interface to the brake disk pressure plate and inhibits heat transfer into the actuator module.

As will be appreciated, rotation of the motor 31 in one direction will effect extension of the ram 26 for engaging and squeezing the brake disk stack 12, whereas rotation in the opposite direction will effect retraction of the ram, as for releasing braking force. In any given position of the ram, the gear train can be locked by the bi-stable holding brake 34. This is desirable, for-example, to retain the rams in an extended position applying braking force to the brake disk stack when the plane is parked, thereby to keep the brake engaged to prevent movement of the aircraft. Although other types of braking devices can be used to maintain the actuators in a brake-engaged condition, preferably the holding brake is a bi-stable device that will latch and hold in either on or off positions, even when no power is being applied to the brake. However, when pulsed the device can be switched between its on and off positions. A suitable bi-stable holding brake can be obtained from Electroid Company of Springfield, N.J., USA. and reference may be had to U.S. Pat. No. 5,185,542, which is hereby incorporated herein by reference in its entirety. As shown in FIG. 9, the bi-stable holding brake can be coupled to the shaft 49 to permit or prevent rotation of the shaft 50 when the brake is on or off, respectively.

As seen in FIGS. 4-10, a mounting flange 73 is provided on the housing for securing the module to the brake head 18. As seen in FIGS. 1 and 2, the brake head 18 has a plurality of radially outwardly opening slots 75 at radially outer sides thereof for receiving respective actuator modules 27. That is, the actuators can be inserted radially into and radially removed from the slots. Moreover, this can be done without having to remove the brake disk stack 12. Accordingly, a defective actuator module can be swapped out without having to undergo any major disassembly of the overall brake assembly.

The mounting flange 73 of each module 27 preferably engages the surface of the brake head facing the brake stack. This surface can be provided with recesses 77 (FIG. 3) for receiving the flanges of the actuator modules, as may be desired to facilitate proper locating of the actuator modules in the brake head and alignment of holes for bolt or other fastening devices. Also, a heat shield 79 can be attached to the side of the brake head nearest the brake stack, which shield can be provided with opening for passage of the actuator rams.

Figure 11:
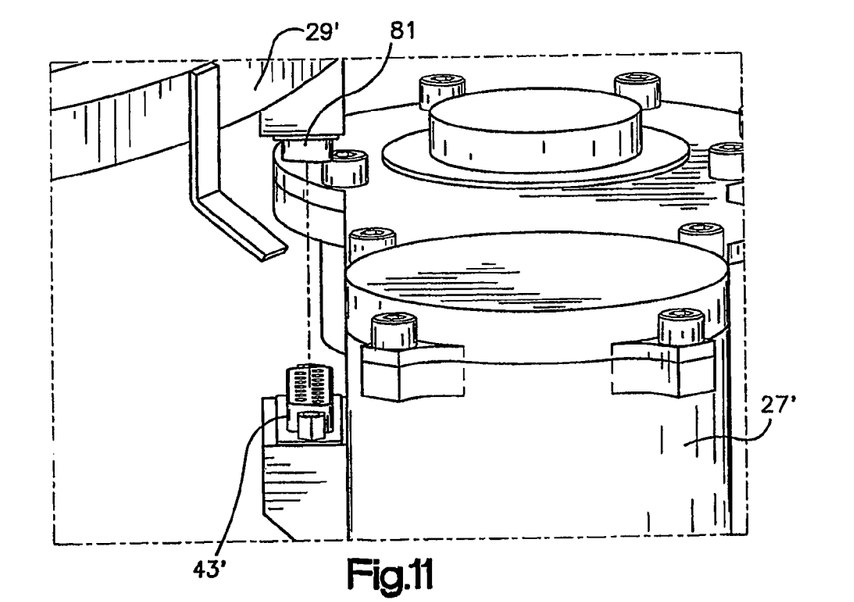
FIG. 11 is a perspective fragmentary rendering showing another mode of connectivity of an actuator module with a cable conduit according to the invention.

The connector 43 on each actuator module 27 and the mating connector of the cable conduit 29 can be configured to provide for connection of the connectors when the actuator module is inserted radially into its respective slot in the brake head. To that end, the connectors can be oriented for radial insertion of one connector into the other connector. In an alternative configuration shown in FIG. 11, each module connector 43' and mating conduit connector 81 can be oriented axially. Accordingly, the actuator modules 27' are first installed, and then the cable conduit is pressed into place to mate the connectors 81 thereof with the respective connectors 43' of the actuator modules. As is preferred, the cable conduit is a single line replacement unit which provides for all electrical connectivity to the actuator modules. The conduit can be formed by a base member having a channel that opens to one side of the base member. The cabling can be placed in the channel and then a cover can be secured to the base member to close the channel. Such securement can be effected by one or more threaded fasteners. The fasteners can be positioned such that when the conduit is installed to the brake head, the fasteners are covered by respective portions of the brake head, thereby to prevent the screws from falling out should they become loose. The conduit can be sealed to prevent entry of foreign material, and the external connectors can be of a type that when mated provide a hermetic seal.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

In addition, the invention is considered to reside in all workable combinations of features herein disclosed, whether initially claimed in combination or not and whether or not disclosed in the same embodiment.

What is claimed is:

1. An electric brake actuator module, comprising:
   a module housing;
   a reciprocating ram; and
   an electric motor operatively connected to the reciprocating ram for selectively extending and retracting the reciprocating ram with respect to the module housing;
   wherein the ram has an inner portion of non-circular cross-section and an outer portion of circular cross-section, and the housing has a guideway for the ram, the guideway having an inner portion of non-circular cross-section for interacting with the inner portion of the ram to prevent rotation of the inner portion of the ram, and an outer portion of circular cross-section.

2. The actuator module as set forth in claim 1, comprising an annular seal between the outer portion of the ram and the outer portion of the guideway.

3. The actuator module as set forth in claim 1, wherein the electric motor is operatively connected to the ram by a screw and a nut linearly driven by the screw, the inner portion of the ram including the nut.

4. The actuator module as set forth in claim 3, wherein the screw and nut are a ball screw and a ball nut.

5. The actuator module as set forth in claim 4, wherein the electric motor is operatively connected to the screw by reducing gears carried on shafts mounted in the housing for rotation about axes parallel to the rotational axes of the electric motor and screw.

6. The actuator module as set forth in claim 1, wherein the guideway is formed by a bore in the housing.

7. An electric brake actuator module, comprising:
   a module housing;
   a reciprocating ram having a first portion of non-circular cross-section for interacting with the module housing to prevent rotation of the ram and a second portion of circular cross-section sealed with respect to the module housing;
   an electric motor operatively connected to the reciprocating ram for selectively extending and retracting the reciprocating ram with respect to the module housing; and
   a bi-stable holding brake having a first state permitting at least retraction of the ram and a second state preventing at least retraction of the ram.

8. The actuator module as set forth in claim 7, wherein the motor is operatively connected to the reciprocating ram by at least one gear on a shaft, and the bi-stable holding brake is coupled to the shaft for permitting rotation of the shaft when in its first state and preventing rotation of the shaft when in its off state.

9. An electric brake actuator module, comprising:
   a module housing;
   a reciprocating ram having a movement direction, a first portion of non-circular cross-section for interacting with the module housing to prevent rotation of the ram, and a second portion of circular cross-section sealed with respect to the module housing;

an electric motor operatively connected to the reciprocating ram for selectively extending and retracting the reciprocating ram with respect to the module housing; and an electrical connector on the module housing, the electrical connector having an insertion direction for connecting to a mating connector, and the insertion direction is parallel to the movement direction of the ram.

10. An electric brake actuator module, comprising:
a module housing;
a reciprocating ram having a movement direction, a first portion of non-circular cross-section for interacting with the module housing to prevent rotation of the ram, and a second portion of circular cross-section sealed with respect to the module housing;
an electric motor operatively connected to the reciprocating ram for selectively extending and retracting the reciprocating ram with respect to the module housing; and
an electrical connector on the module housing, the electrical connector having an insertion direction for connecting to a mating connector, and the insertion direction is perpendicular to the movement direction of the ram.

11. A cable conduit for an electric brake, comprising:
a generally arcuate-shaped channel;
a plurality of module connectors disposed along the length of the channel for connecting to respective actuator modules of an electric brake, wherein the actuator modules individually comprise a reciprocating ram having a first portion of non-circular cross-section for interacting with a module housing to prevent rotation of the ram and a second portion of circular cross-section sealed with respect to the module housing;
a common connector disposed along the length of the channel for connecting to an external cable; and
electrical wiring in the channel for connecting the common connector to each of the module connectors.

12. The cable conduit as set forth in claim 11, wherein each module connector has an insertion direction for connecting to a mating connector that is parallel to the insertion direction of each other module connector.

13. A brake comprising:
a brake head; and
at least one actuator module mounted to the brake head, the actuator module including a reciprocating ram, a motive device operatively connected to the reciprocating ram for selectively moving the reciprocating ram into and out of forceful engagement with a brake disk stack for applying and releasing braking force; and
a module housing in which the ram and motive device are carried for removal from the brake head as a unit, wherein the reciprocating ram comprises a first portion of non-circular cross-section for interacting with the module housing to prevent rotation of the ram and a second portion of circular cross-section sealed with respect to the module housing; and
wherein the brake head has at least one radially outwardly opening slot at a radially outer side thereof for receiving said one actuator module.

14. The brake as set forth in claim 13, further comprising the brake disk stack.

15. The brake as set forth in claim 13, wherein the module housing includes a flange, and the flange engages the surface of the brake head facing the brake disk stack.

16. The brake as set forth in claim 15, wherein the surface of the brake head facing the brake disk stack has a recess for receiving the flange of the module housing.

17. A ram assembly for an electric brake, comprising a housing having a guideway and a ram axially movable in the guideway, the ram having a first portion of non-circular cross-section for interacting with the housing to prevent rotation of the ram and a second portion of circular cross-section sealed with respect to the housing.

18. A brake comprising:
a brake head; and
at least one actuator module mounted to the brake head, the actuator module including:
an electric motor operatively connected to a reciprocating ram for selectively moving the reciprocating ram into and out of forceful engagement with a brake disk stack for applying and releasing braking force, and
a module housing in which the electric motor is carried for removal from the brake head as a unit, wherein the reciprocating ram comprises a first portion of non-circular cross-section for interacting with the module housing to prevent rotation of the ram and a second portion of circular cross-section sealed with respect to the module housing; and
wherein the brake head has at least one radially outwardly opening slot at a radially outer side thereof for receiving said one actuator module.

* * * * *